(12) United States Patent
Frazier

(10) Patent No.: US 7,730,902 B2
(45) Date of Patent: Jun. 8, 2010

(54) CONTAINMENT RAIL SYSTEM

(75) Inventor: Douglas Frazier, Claremont, CA (US)

(73) Assignee: Enviroguard, Montclair, CA (US)

( * ) Notice: Subject to any disclaimer, the term of this patent is extended or adjusted under 35 U.S.C. 154(b) by 295 days.

(21) Appl. No.: 12/026,968

(22) Filed: Feb. 6, 2008

(65) Prior Publication Data
US 2009/0194171 A1 Aug. 6, 2009

(51) Int. Cl.
*H01M 2/10* (2006.01)
*F16N 31/00* (2006.01)

(52) U.S. Cl. .............. 137/15.18; 137/315.01; 137/312; 220/495.01; 220/571; 141/86

(58) Field of Classification Search ............. 137/312, 137/315.01, 15.18; 141/86; 220/571, 495.01
See application file for complete search history.

(56) References Cited

U.S. PATENT DOCUMENTS

| | | | | |
|---|---|---|---|---|
| 4,270,661 A | * | 6/1981 | Rosenband | 211/59.2 |
| 4,632,602 A | | 12/1986 | Hovnanian | 405/128 |
| 5,295,591 A | * | 3/1994 | Slater | 211/59.2 |
| 5,454,195 A | | 10/1995 | Hallsten | 52/169.1 |
| 5,464,492 A | | 11/1995 | Gregory et al. | 156/246 |
| D385,362 S | | 10/1997 | Rossetti | D25/58 |
| 5,689,920 A | | 11/1997 | Hallsten | 52/169.1 |
| 5,775,869 A | * | 7/1998 | Bishop | 414/608 |
| D431,082 S | | 9/2000 | Jaros | D25/113 |
| 6,261,714 B1 | | 7/2001 | Eidler et al. | 429/70 |
| 6,308,728 B1 | | 10/2001 | Frazier | 137/312 |
| 6,395,417 B1 | | 5/2002 | Frazier | 429/49 |
| 6,695,534 B2 | | 2/2004 | Cain et al. | 405/52 |
| 6,901,946 B2 | | 6/2005 | Frazier | 137/312 |
| 7,008,719 B2 | | 3/2006 | Zaffino | 429/49 |
| 7,124,771 B2 | | 10/2006 | Frazier | 137/312 |

* cited by examiner

*Primary Examiner*—Kevin L Lee
(74) *Attorney, Agent, or Firm*—Pillsbury Winthrop Shaw Pittman LLP

(57) ABSTRACT

Disclosed is a modular spill containment rail system for containing a hazardous spilled substance from at least one battery. The system has a plurality of containment rails that are connectable to one another to define a perimeter around the battery. Each rail has at least one wall with a first end and a second end. At least one male connection device orthogonally protrudes from the first end and at least one female opening may be provided in the second end. A first end of a first rail may be removably received within a second end of second rail. Upon connecting the rails, at least a part of the first end of the first rail may be in an overlapping relationship with the second end of the second rail. A method for assembling a system and a containment system with a flexible liner and a neutralizing material are also disclosed herein.

24 Claims, 16 Drawing Sheets

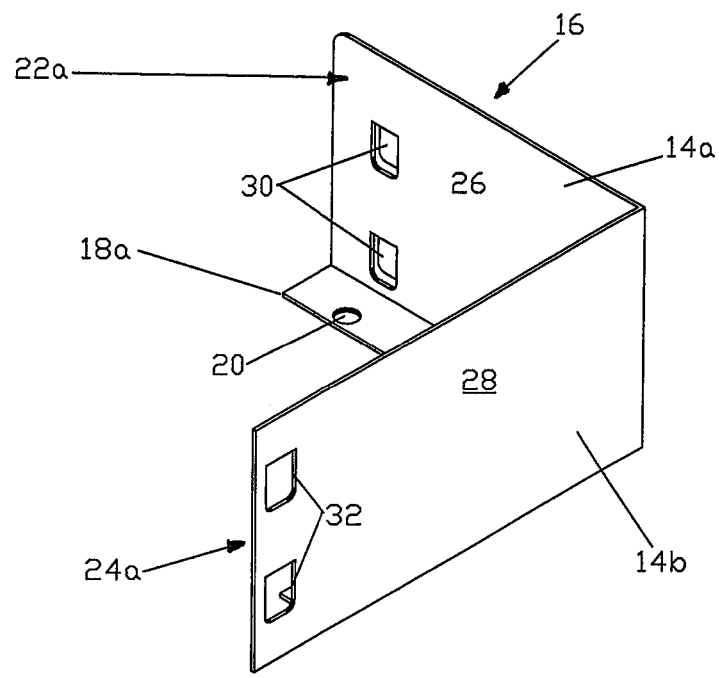
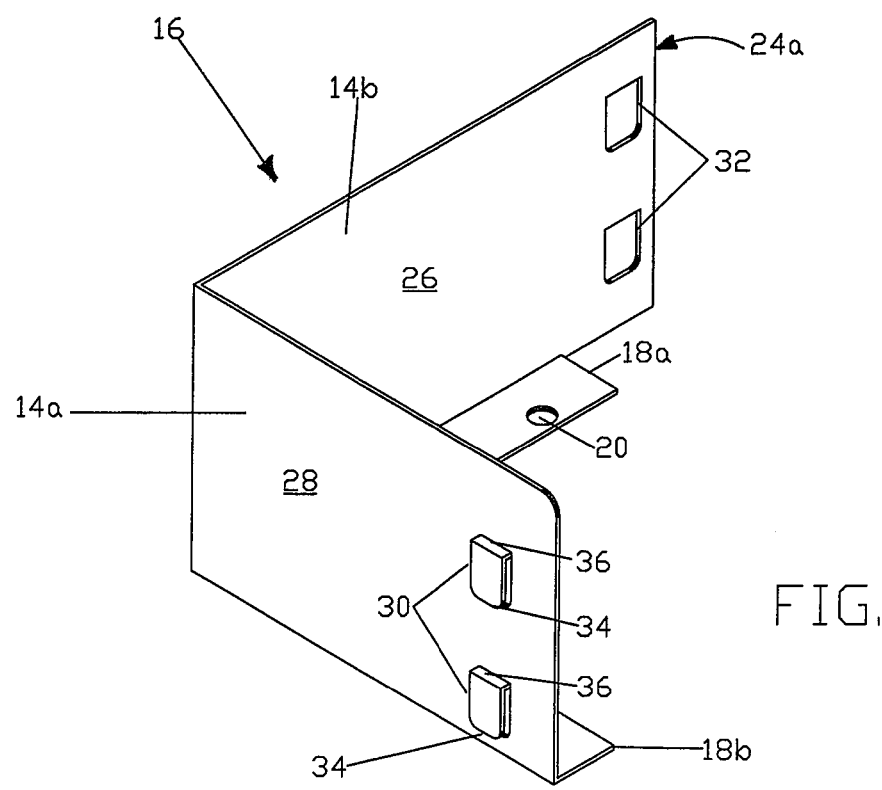
FIG. 3a
FIG. 3b

CONTAINMENT RAIL SYSTEM

FIELD OF INVENTION

The present invention is generally related to spill containment systems and methods for containing a spilled substance from storage devices. More particularly, the present invention is related to connection devices and methods used to connect a plurality of containment rails for spill containment systems that may be used with storage devices such as a battery.

BACKGROUND

In our industrial society, devices often contain substances that may leak or spill undesirably onto other devices, personally, or the environment. For example, batteries may be stored on battery racks or other structures where the batteries serve as a backup power supply for data communication centers and computers. These batteries may contain acidic or alkaline substances that may leak or spill onto other batteries, cables, equipment, and other devices as well as personnel, thereby posing a hazard to people and property. Sulfuric acid, commonly found in batteries, is an extremely hazardous material regulated by the federal, state and local governments. With respect to batteries, Article 64 of the Uniform Fire Code requires a four-inch high containment barrier with an acid neutralization capability to a pH of 7-9. Similarly, other devices that may use spill containment systems include, but are not limited to, air conditioning units that may drip water from condensation or leak Freon, or water heaters that may leak water.

Therefore, the inventor has found that it is desirable to contain leaks and spills from hazardous devices such as batteries. While spill containment systems exist, the existing systems need to be improved. For example, storage space for battery backup systems is precious and as companies become increasingly dependent on computers, their need for storing a greater number of batteries increases. Thus, companies utilizing battery backup systems would like to be able to store as many batteries as they can in their space, such as a warehouse or basement or other rooms. Some of the rooms may have structures that obstruct the floor space (such as columns); others may have non-rectangular areas. Battery spill containment systems preferably should be able to be installed in virtually any of these diverse rooms. The systems should also be able to be installed quickly and easily in a given space at a low cost, and with minimal effort and time. Additionally, the rails of the spill containment systems should provide a reinforced and secure environment around the perimeter of the batteries.

Therefore, the inventor has found that it is desirable to have improved designs of a battery spill containment system that permits a greater number of batteries to be stored in a given space, easy access to the batteries, increased safety, and modularity of designs.

SUMMARY OF THE INVENTION

One aspect of an embodiment of the invention provides a battery spill containment rail system for containing a hazardous spilled substance from at least one industrial battery. The system has a plurality of containment rails that are connectable to one another to define a perimeter for accommodating at least one industrial battery. Each rail has at least one wall with a first connection end and a second connection end. A first rail of the plurality of rails has a male connecting device at a connection end and a second rail of the plurality rails has a female connecting device at a connection end. The male connecting device of the first rail may be constructed and arranged to be removably received within the female connecting device of the second rail when the first and second rail are connected. Upon connecting the first rail to the second rail, at least a part of the first connection end of the first rail may be in an overlapping relationship with the second connection end of the second rail.

Another aspect of an embodiment of the invention provides a modular battery spill containment system for containing a hazardous spilled substance from at least one battery. The system includes a plurality of containment rails defining a perimeter around at the least one battery. Each rail has at least one wall with a first end and a second end. At least one connection device orthogonally protrudes from the first end of each rail, and at least one opening may be provided in the second end of each rail. The first end of each rail may be constructed and arranged to be removably received within a second end of another rail of the plurality of containment rails. Also, the first and second ends of the rails may be provided in an overlapping relationship when the plurality of rails is connected to form the perimeter.

An aspect of an embodiment of the invention provides a method for assembling a modular battery spill containment system for containing a hazardous spilled substance from at least one industrial battery. The method for assembling the containment system includes aligning ends of a first and second rail, wherein the rails have at least one wall, a first end, and a second end; inserting an orthogonal protrusion of the first end of the first rail through an opening in the second end of the second rail to connect the first rail to the second rail; connecting a plurality of rails to form a perimeter around at least one battery; placing a flexible liner within the perimeter defined by the plurality of containment rails, the flexible liner being resistant to damage from the spilled substance; and placing a material in the perimeter of the rails, the material adapted to absorb and chemically neutralize the spilled substance. Upon connecting the plurality of containment rails, at least a part of the first connection end of each of the rails may be in an overlapped relationship with a second end of another rail.

An aspect of an embodiment of the invention also provides an assembled battery spill containment device. The device has a plurality of containment rails that are removably connected to each other. The plurality of containment rails defines a perimeter and a volume, and one or more batteries are positioned within the perimeter defined by the containment rails. The containment rails are connected to one another by male and female connecting devices, and the ends of the connected containment rails may overlap each other.

Other objects, features, and advantages of the present invention will become apparent from the following detailed description, the accompanying drawings, and the appended claims.

BRIEF DESCRIPTION OF THE DRAWINGS

FIGS. 3a-3d illustrate side perspective, top, and side views, respectively, of a corner rail comprising tabs and corresponding openings for use with the containment rail of FIGS. 2a-2c in a battery spill containment system in accordance with an embodiment of the present invention.

DETAILED DESCRIPTION OF PREFERRED EMBODIMENTS OF THE INVENTION

The herein described embodiments of the invention relate to a spill containment system and method, which can apply to containment of spills from any kind of device. Where embodiments are directed to a battery spill containment system, it is to be understood that the system can be adapted for containing spills from other devices.

Figure 1A:
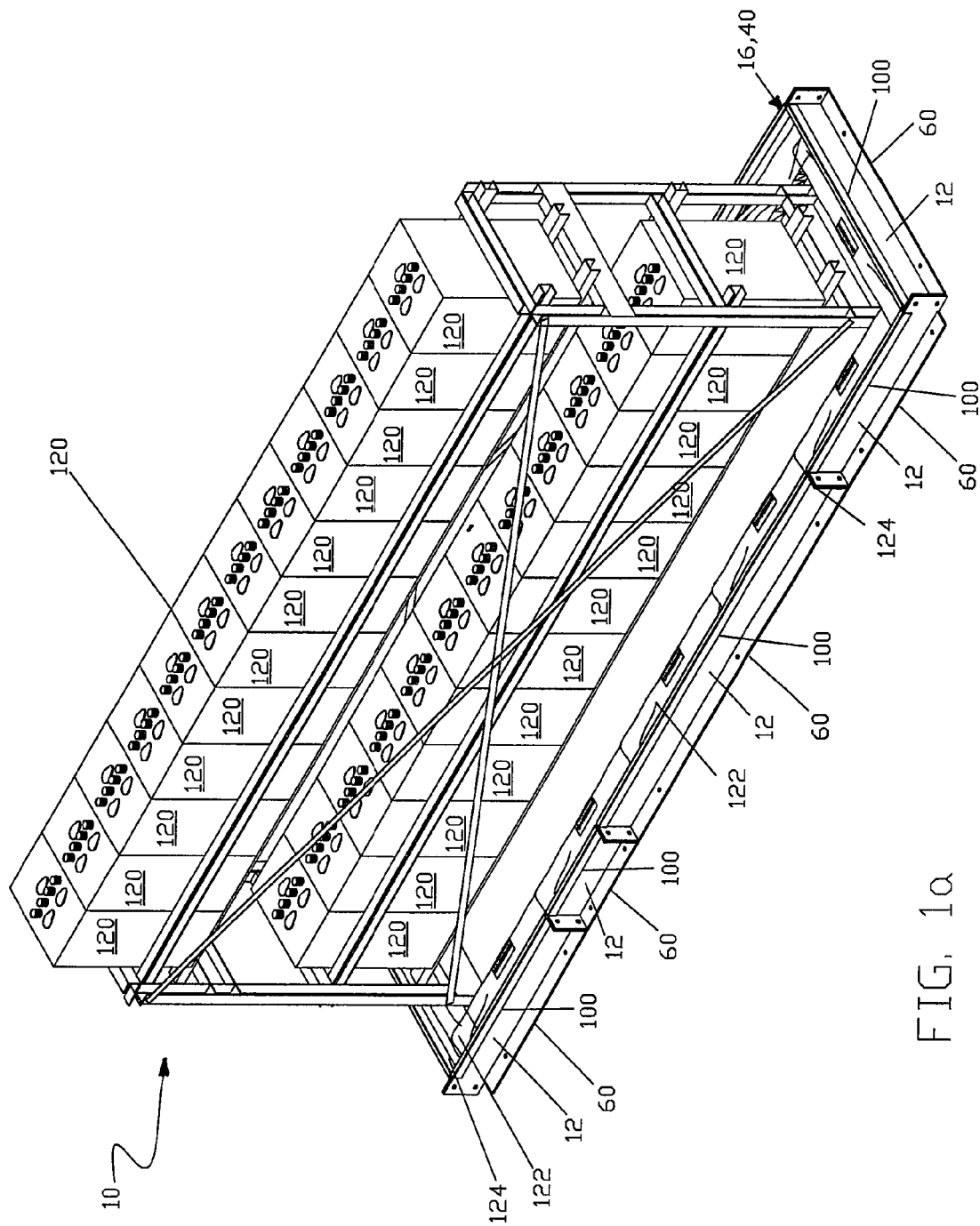
FIGS. 1a and 1b are a perspective and top view, respectively, of a battery spill containment system with modular containment rails surrounding at least one battery in accordance with an embodiment of the present invention.
Figure 1B:
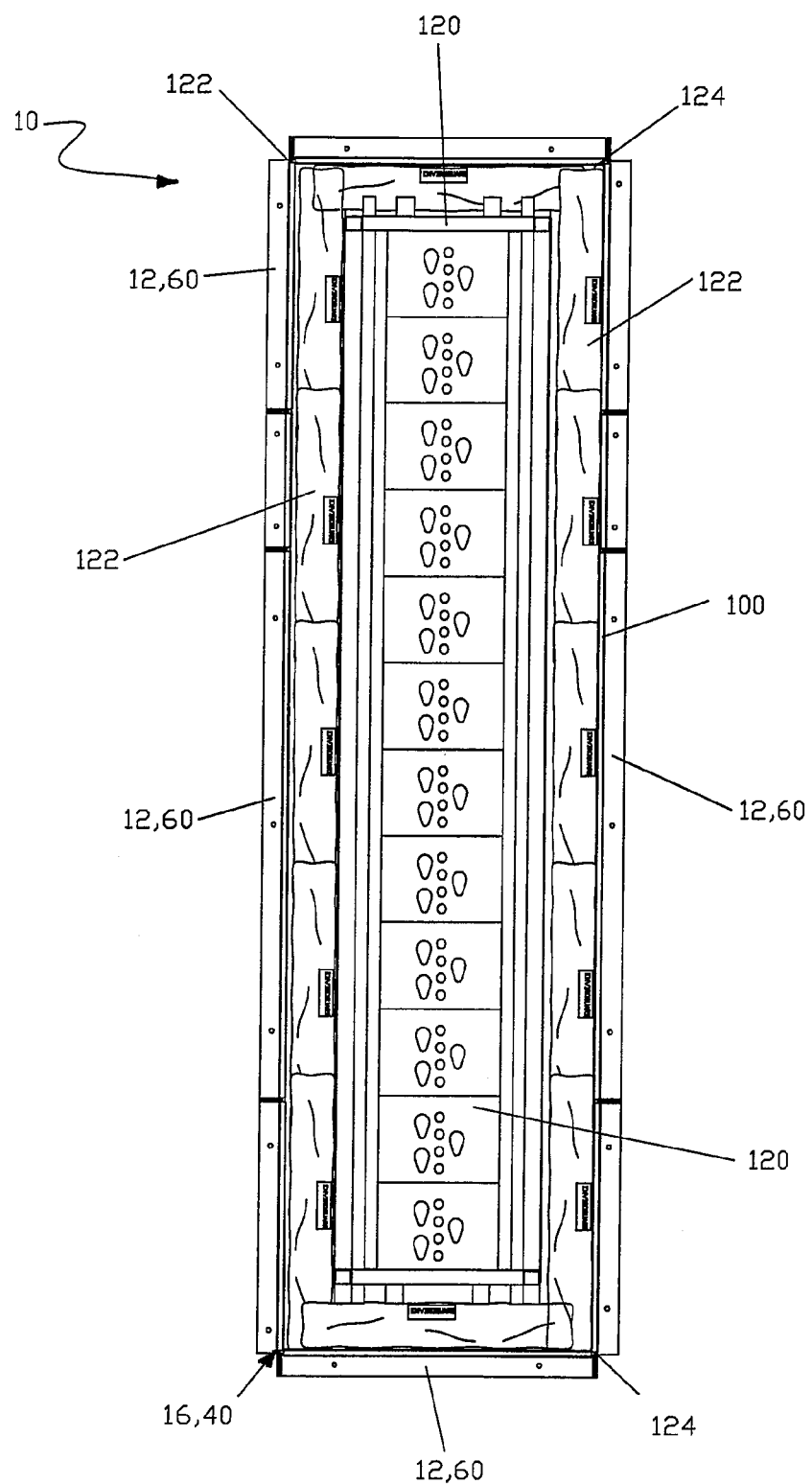

FIGS. 1a and 1b are a perspective and top view, respectively, of a battery spill containment system 10 with modular containment rails surrounding at least one battery 120 (or a plurality of batteries) in accordance with an embodiment of the present invention. Overall, the spill containment system 10 may be designed to contain a hazardous spilled substance from any of the batteries 120. The system 10 may be provided to prevent acid from leaking onto the floor in order to limit a hazardous situation for employees who may slip and fall, or burn themselves on the acid, as well as prevent the acid from damaging nearby property and devices. For example, the battery(ies) 120 may be provided to serve as a back-up power supply or energy source for computers, telecommunications, and data management systems, so it is preferred that the spilled battery acid does not damage nearby cables and computers.

The battery spill containment system 10 may be used with a flexible liner 124 and a material 122 for absorbing and chemically neutralizing the spilled substance of the at least one battery 120. The liner 124 may be provided for placement within the perimeter defined by the plurality of containment rails. The flexible liner 124 is resistant to damage from the spilled substance. For example, the liner 124 may be fabricated of polyvinylchloride (PV) with dielectric welded or thermal welded seams to prevent leakage at the seams or corners. Other materials such as vinyl or other material that is resistant to damage from the spilled substance may be used for liner 124. Also, the absorbent material 122 may be provided for placement within the perimeter defined by the plurality of containment rails. The absorbent material 122 may be in the form of pillows and/or socks for example, and may be placed in the flexible liner 124. The absorbent material 122 may take any form, shape, size, or configuration. The absorbent material 122 may comprise a plurality of materials, e.g., one to act as an absorber and another to act as a chemical neutralizer. Other known examples of liners 124 and materials for the liners 124 and absorbent material 122 generally known in the art may also be used with the system 10 described herein, and should not be limited hereto.

Generally, the battery spill containment system 10 may comprise straight, curved, or corner rails. For example, a corner rail may be a ninety degree corner, a sixty degree corner, a forty-five degree corner, or any other corner as described. As will be shown and described, the rails (e.g., side rails 12, 60 and corner rails 16, 40) may comprise connecting devices on the ends thereof no matter what the dimensions, shape, size, and/or configuration of the rail. The rails 12, 16, 40, and 60 and the connecting devices herein are exemplary and therefore should not be limiting. The system 10 may also comprise a clip or clip device 100 may be used to hold the top edge of a liner to the top edge of a rail, as will be further described herein.

Figure 2A:
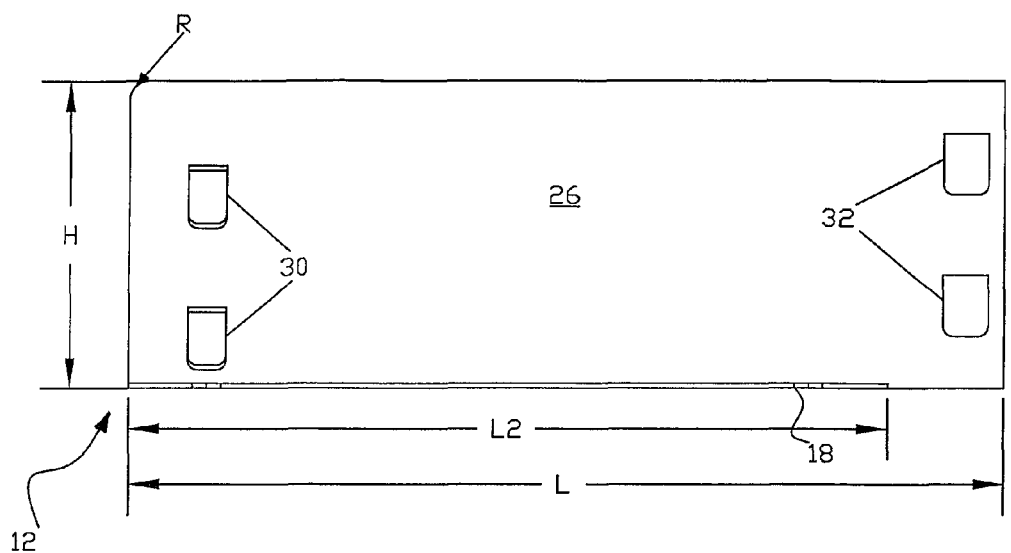
FIGS. 2a-2c illustrate a front, top, and perspective view, respectively, of a containment rail comprising male connecting devices and female connecting devices for use in a battery spill containment system in accordance with an embodiment of the present invention.
Figure 2B:
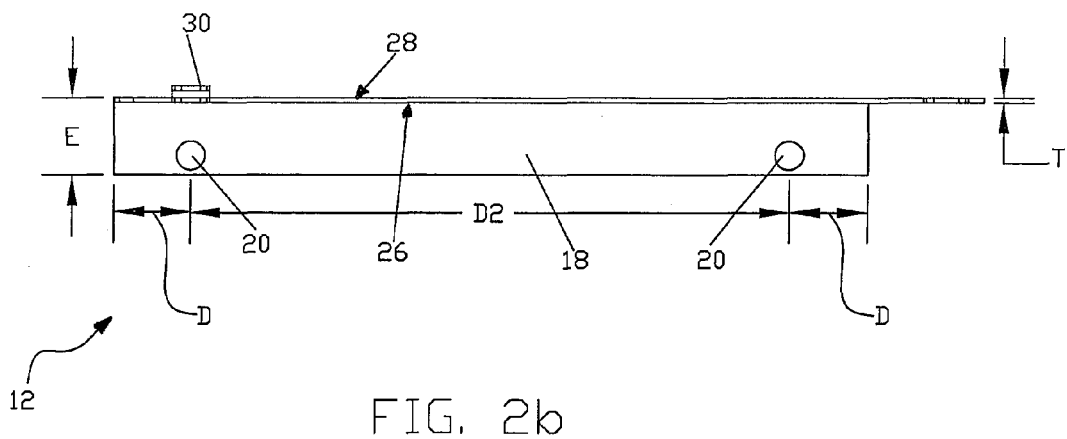
Figure 2C:
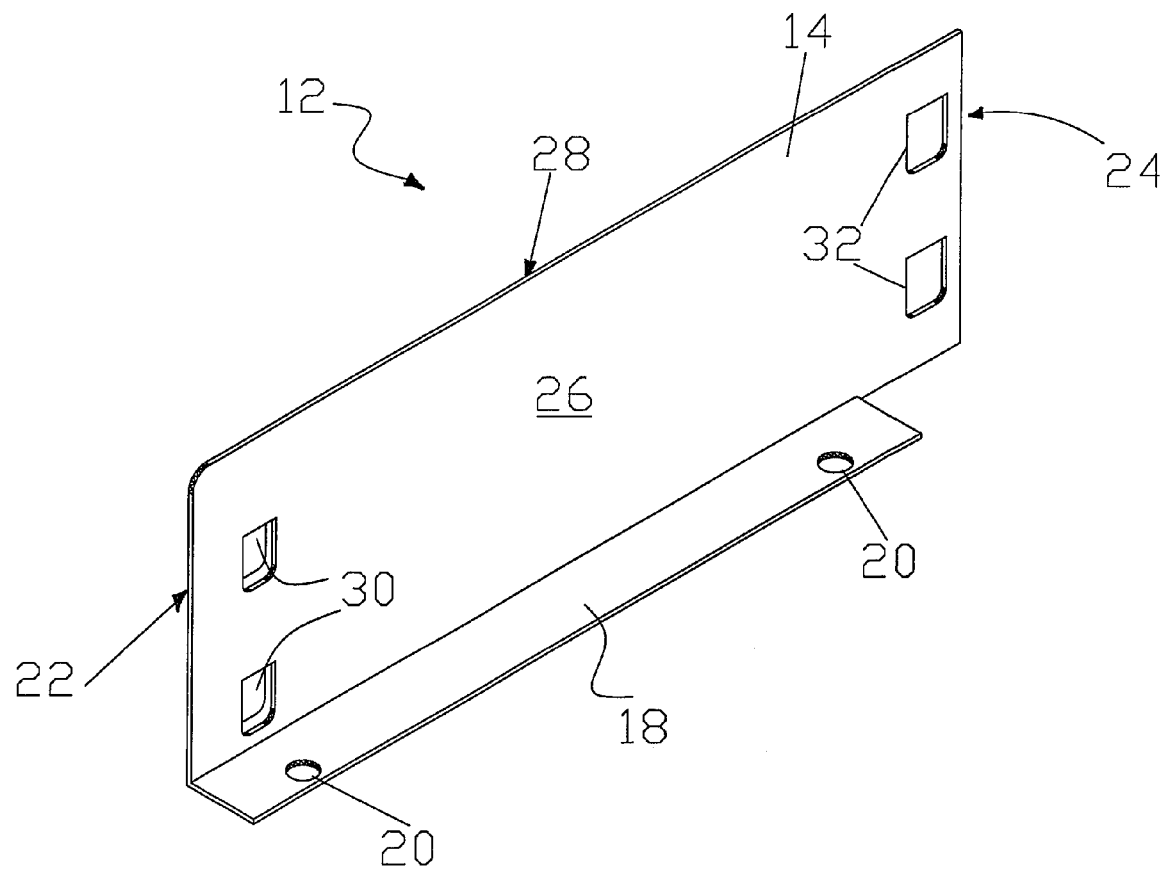

FIGS. 2a-2c illustrate a front, top, and perspective view, respectively, of a containment rail 12 comprising male connecting devices 30 and female connecting devices 32 for use in a battery spill containment system 10 in accordance with an embodiment. Containment rail 12 may be used as an intermediate section or side rail in system 10 as shown in FIG. 1, for example. The rails 12 may be connected to other rails (e.g., with other side rails 12 or with corner rails 16, as illustrated and described with respect to FIGS. 3a-3d below) to form a perimeter or area around at least one battery 120, or they may be mounted indirectly so as to prevent substantial movement of one rail relative to another rail.

In an embodiment, the rails 12 (and the rails 16, 40, and 60 as will be described in FIGS. 3a-5e) may be resistant to damage from a hazardous spilled substance, such as acid. For example, the rails 12 may be formed out of a corrosion-resistant material such as PVC, vinyl, fiberglass, polypropylene, or plastics. As another example, the rails 12 may be covered with a protective coating or otherwise treated to protect the rail from damage.

Referring back to FIGS. 2a-2c, the containment rail 12 comprises a side wall 14 and a floor mounting flange 18. The side wall 14 comprises an inside wall 26 and an outside wall 28. Inside wall 26 is provided such that when a perimeter is formed around at least one battery, the inside wall 26 faces the battery while outside wall 28 faces the opposing direction. The floor mounting flange 18 is provided to mount or attach a rail 12 to floor. In an embodiment, the floor mounting flange 18 comprises at least one hole 20 to attach the rail 12 to a floor of a basement or warehouse (e.g., where the at least one battery or rack of batteries are herein provided), for example. In an embodiment, hole(s) 20 allows a screw, nail, threaded fasteners, bolts, or any other mounting to connect or mount the rails 12 to the floor or other structure. In an embodiment, the number of hole(s) 20 may be increased or decreased. In an embodiment, floor mounting flange 18 may be connected to a floor using adhesive or glue. Thus, the rail 12 may comprise no holes. In an embodiment, neither glue nor fasteners are provided. Generally, any known method of mounting a rail to a floor or surface may be used with the rails 12 described herein.

The rail 12 may be designed or sized using various lengths. The side wall 14 may also be designed or sized using various lengths. For example, the side wall 14 may be designed or sized such that it has a length substantially equal to the overall length of the rail 12. In an embodiment, the side wall 14 may be sized to have a length L of approximately thirteen and one-half (13½) inches (34.29 centimeters). In some embodiments, the side wall 14 may comprise a height H of four (4) inches (10.2 centimeters). The floor mounting flange 18 may be sized or designed to have various measurements. For example, the floor mounting flange 18 may have the same length as the side wall 14 and/or rail 12. The flange 18 may also have a shorter length than that of the side wall 14 and/or rail 12. In an embodiment, the flange 18 may have a length of approximately twelve (12) inches (30.48 centimeters). In an embodiment, the flange 18 may have an extension size E of approximately one (1) inch (2.54 centimeters). Additionally, the holes 20 may be spaced apart by a uniform amount or a non-uniform amount. In an embodiment, the holes are provided at a distance D approximately three (3) inches (7.62 centimeters) from the ends of the flange 18. In an embodiment, the holes are provided at a distance D2 approximately six (6) inches (15.2 centimeters) from each other. The side wall 14 and/or rail 12 may also have a material thickness T. In an embodiment, the side wall and/or rail 12 may comprise a thickness T of approximately one-sixteenth (1/16 or 0.0625) inches (0.015875 centimeters). The rail 12 and its parts may have any number of lengths, widths, heights, and/or thickness measurements.

Side wall 14 of rail 12 also comprises a first connection end 22 and an opposite or second connection end 24. First end 22 comprises at least one male connecting device or member 30 and second end 24 comprises at least one female connecting device or member 32. In an embodiment, the first connection end 22 and second connection end 24 comprise a plurality of members 30, 32. However, it should be noted that the location of the male and female connecting devices 30, 32 may be interchangeable. In an embodiment, the rail 12 may have male connecting members 30 at one end and female connecting members 32 at the opposite end.

The male connecting devices 30 may comprise at least one orthogonal projection extending from the first connection end 22. For example, as shown in FIGS. 2a-2c, the male connecting device 30 may comprise an "L"-shaped tab comprising a first wall 34 and a second wall 36 (which are further described with reference to FIG. 3d). The female connecting devices 32 may comprise a corresponding opening that is designed to receive the orthogonal projection of the first connection end 22. For example, the tabs 30 of a first end 22 of a first rail may be removably received within an opening 32 on a second end 24 of a separate, second rail. The openings 32 may comprise a complimentary, opposite shape to that of the "L"-shaped tabs 30. For example, the openings may be rectangular or rounded so as to receive an entire tab 30 therein. The method of connecting the tabs 30 and openings 32 of rails 12 is further described below.

FIGS. 3a-3d illustrate side perspective, top, and side views, respectively, of a corner rail 16 comprising tabs 30 and corresponding openings 32 for use with the containment rail 12 of FIGS. 2a-2c. Corner rail 16 comprises a first wall 14a and a second wall 14b connected at ends thereof to form an angled rail. For example, walls 14a and 14b of the corner rail 16 may form a ninety degree corner, a sixty degree corner, a forty-five degree corner, or any other corner with an angle therebetween. First wall 14a and second wall 14b each comprise an inside wall 26 facing a battery and an outside wall 28. The first wall 14a comprises a flange 18a and the second wall 14b comprises a flange 18b. The flanges 18a, 18b are floor mounting flanges comprising at least one hole 20 to attach the corner rail 16 to a floor of a basement or warehouse (e.g., where the at least one battery 120 or rack of batteries are provided), for example, as noted above with respect to rail 12. Generally, any known method of mounting a rail may used to attach corner rails 16 to a floor or surface.

The walls 14a, 14b of rail 16 may comprise a plurality of lengths. For example, in an embodiment, the side wall 14 may comprise lengths that are substantially equal. In an embodiment, the side walls 14 may have a length L of approximately seven and one-half (7½) inches (19.05 centimeters). In an embodiment, the walls 14a, 14b may have different lengths. For example, the wall 14b may be longer in length than wall 14a. For example, the wall 14a may have a length of approximately six (6) inches (15.24 centimeters) and the wall 14b may have a length of seven and one-half (7.5) inches (19.1 centimeters). The floor mounting flanges 18a, 18b may have any number of lengths. For example, the floor mounting flanges 18a, 18b may have the same length. The flanges 18a, 18b may also have different lengths. In an embodiment, the flanges 18a, 18b comprises a similar length of approximately five (5) inches (12.7 centimeters). Additionally, as noted above, the flanges 18a, 18b may extend E and the holes 20 may be spaced apart by a uniform amount or a non-uniform amount (e.g., distances D or D2). The side walls 14a, 14b may also have a material thickness T, as noted above. The corner rail 16 and its parts may have any number of lengths, widths, heights, and/or thickness measurements.

The corner rail 16 also comprises a first end 22a and a second end 24a for attachment or connection to another rail in spill containment system 10. The first and second ends 22a, 24a may have male and female connection devices 30, 32, respectively, which may be used for connecting rails 12 to the ends 22a, 24a of the corner rail 16, for example, to form the perimeter of system 10. In an embodiment, male connection devices 30 may be provided on one end of the corner rail 16 and female connection devices 32 may be provided on the opposite end of the rail 16. For illustrative purposes, male connection devices 30 are provided on first end 22a and female connection devices 32 are provided on second end 24a. Male connection devices 30 comprise a tab 30 constructed and arranged to be removably received within the female connection devices 32. For example, in an embodiment, the orthogonal projections or male connection devices 30 may comprise a first wall 34 and a second wall 36. The walls 34, 36 may form and "L"-shaped tab 30. Any shape, configuration, or design for inserting a male connection device 30 into female connection device 32, however, may be used.

The female connection devices 32 may be designed to removably receive and interlock with male connection devices 30. In an embodiment, female connection devices comprise a shape or configuration that corresponds or is complementary to the male connection device 30. Generally, as shown in FIG. 3d, female connection devices 32 comprise an opening that extends through the wall 14b.

Figure 3C:
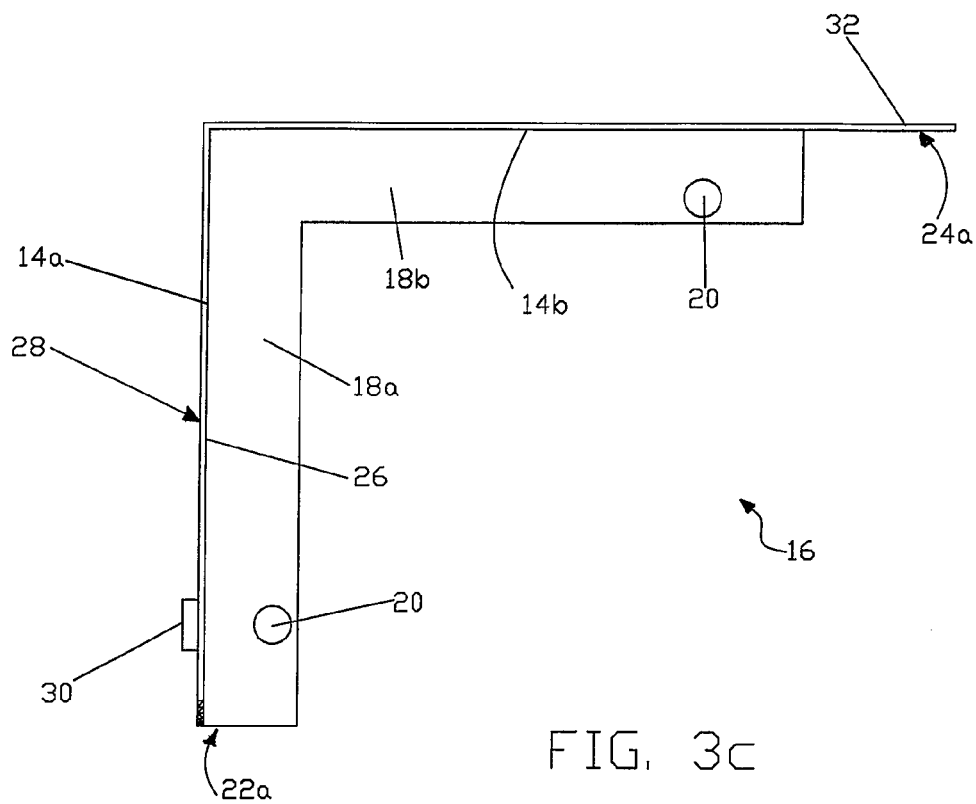
Figure 3D:
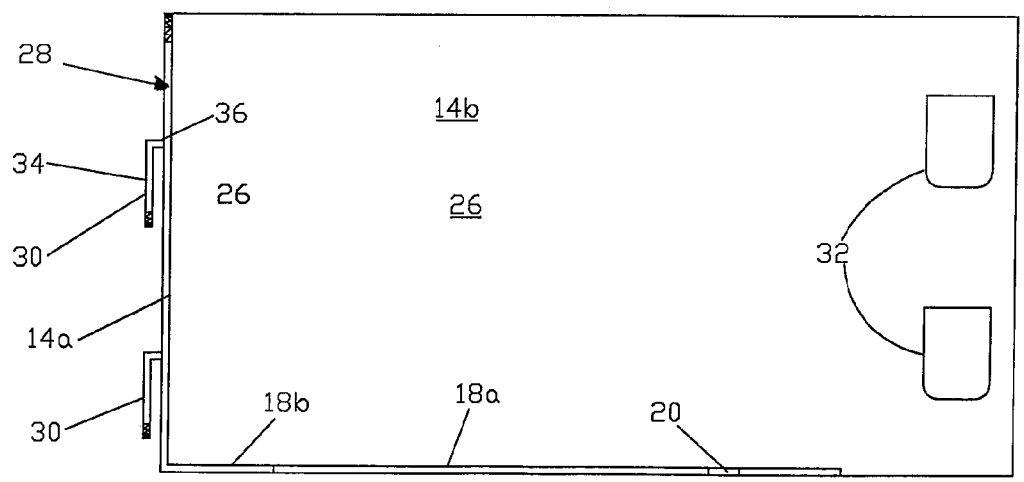

FIG. 3d also shows a detailed side view (whose direction is indicated by the arrow in FIG. 3b) of the corner rail 16. As noted above, male connecting devices 30 may comprise "L"-shaped tabs comprising a first wall 34 and a second wall 36. The second wall 36 extends or protrudes outwardly from and is perpendicular or orthogonal to the outside 28 of wall 14a. First wall 34 is perpendicular to the second wall 36. That is, the first wall 34 is generally parallel to the outside 28 of wall 14a, forming a right angle with second wall 36.

Male connecting devices or tabs 30 may be formed from a punching, stamping, or a molding process, for example. The female connecting devices or openings 32 may similarly be formed from punching, stamping, or a molding process, for example.

To connect the male connecting devices or "L"-shaped tabs 30 with the female connecting devices or corresponding openings 32 of a plurality of rails such as rails 12 and 16 to form a perimeter around at least one battery, a number of rails 12, 16 may be gathered that are required to form a sufficient perimeter or boundary around the designated area. For illustrative purposes only, the method of assembly will be described with respect to connecting a side rail 12 of FIGS. 2a-2c with a corner rail 16 of FIGS. 3a-3d. However, the method may be used to connect any number of rails 12, 16 to each other, in any order, and should not be limiting.

A first end 22 of a first rail 12 is aligned with a second end 24a of a second rail 16 such that the first and second walls 34, 36 of tabs 30 extending orthogonally from the side wall 14 of rail 12 are aligned with the openings 32 in side wall 14b of rail 16. The first and second walls 34, 36 of the tabs 30 on rail 12 are then inserted through the openings 32 of the second rail 16. After insertion, the first rail 12 is connected and locked with the second rail 16 by applying a downward pressure to the first rail 12 such that the tabs 30 move downwardly with respect to the openings 32. More specifically, the side wall 14b near opening 32 is inserted between the outside 28 of the side wall 14a and the first wall 34 of the tab 30, such that the second wall 36 of the tabs 30 may rest on the bottom edge of the openings 32. FIGS. 3e and 3f illustrate a top and perspective view, respectively, of such a connection between a plurality of containment rails (e.g., rail 12 and corner rail 16).

As noted above, the advantages of using connecting devices such as male connecting devices 30 and female connecting devices 32 may include the ability to provide a battery spill containment system that may be installed quickly and easily in a designated space at low cost. The system also requires less tools and parts, as the rails themselves provide a locking system (rather than using hardware such as bolts, nuts, and the like). The system 10 provides the ability to disassemble or detach the rails from each other and reassemble with ease. Thus, the devices 30, 32 of the herein described system assist in decreasing the amount of required labor and assembly time. Additionally, using a system 10 with rails having male and female connecting devices as described herein also permits a greater number of batteries to be stored in a given space, provides easy access to the batteries, and improves modularity of designs.

The rails 12, 16 of the system 10 are also reusable. Additionally, when the rails are connected to each other, the rails are designed to support each other and become a free-standing object. Thus, the structural integrity of the system 10 is increased.

Furthermore, upon connecting a first rail to a second rail, at least a part of the first connection end of the first rail is provided in an overlapping relationship with the second connection end of the second rail. The overlapping connection of the rails (e.g., which form a perimeter around a battery(ies)) provides a reinforced connection between the rails of the battery spill containment system 10.

FIGS. 4a-4d illustrate a back perspective, side perspective, top, and side views, respectively, of a corner containment rail 40 comprising pin connecting members 54 and keyhole openings 56 for use in a battery spill containment system in accordance with an embodiment of the present invention. Corner containment rail 40 comprises a first wall 42a and a second wall 42b connected at ends thereof to form an angled rail, such as a ninety degree corner as described with respect to corner rail 16 of FIGS. 3a-3d. First wall 42a and second wall 42b may each have an inside wall 50 facing a battery and an outside wall 52 on the opposite side thereof. The first wall 42a may have a flange 44a and the second wall 42b may have a flange 44b. The flanges 44a, 44b are floor mounting flanges comprising at least one hole 45 to attach the corner rail 40 to a floor of a basement or warehouse, for example, as noted above with respect to rail 12 in FIGS. 2a-2c. Generally, any known method of mounting a rail may be used to attach corner rails 40 to a floor or surface.

The corner rail 40 also comprises a first end 46 and a second end 48 for attachment or connection to another rail in a spill containment system. The first and second ends 46, 48 comprise male and female connection devices 54, 56, respectively, which may be used for connecting rails (e.g., such as side or straight rails) to the ends 46, 48 of the corner rail 40, for example, to form a perimeter. In an embodiment, male connection devices 54 may be provided on one end of the corner rail 40 and female connection devices 56 may be provided on the opposite end of the rail 40. For illustrative purposes, male connection devices 54 are provided on first end 46 and female connection devices 56 are provided on second end 48. Male connection devices 54 may comprise an orthogonal projection such as a pin designed to be insert into (and interlock therewith) the female connection devices 56. For example, in an embodiment, the pins 54 extend from the outside wall 52 of the rail 40 and comprise a rounded head 55. The male connectors are shown as "T" cross section; however other configurations or designs for the male connection device or pin 54 and its head 55, may be used.

The female connection devices 56 are designed to removably receive and interlock with male connection devices 54. In an embodiment, female connection devices 56 comprise a shape or configuration that corresponds or is complementary to the male connection device 54. Generally, as shown in detail in FIG. 4d, female connection devices 56 comprise an opening that extends through the wall 42b. For example, the openings 56 may be in the shape of a keyhole opening such that the rounded head 55 of the pin 54 may be inserted into the opening 56. After insertion of the pin 54, pressure or other force may be applied downwardly so as to move pin 54 into the narrow end of the keyhole opening 56 and thus connect and lock a rail therein.

Male connecting devices or tabs 30 may be formed from a punching, stamping, or a molding process, for example. The female connecting devices or openings 32 may similarly be formed from punching, stamping, or a molding process, for example.

As noted above, the measurements of the corner containment rail 40 and its parts (e.g., flanges 44a, 44b) may comprise any number of lengths, widths, heights, and/or thicknesses. For example, the corner containment rail 40 may comprise measurements similar to those as described for corner rail 16 of FIGS. 3a-3d and/or FIGS. 2a-2c.

Figure 4A:
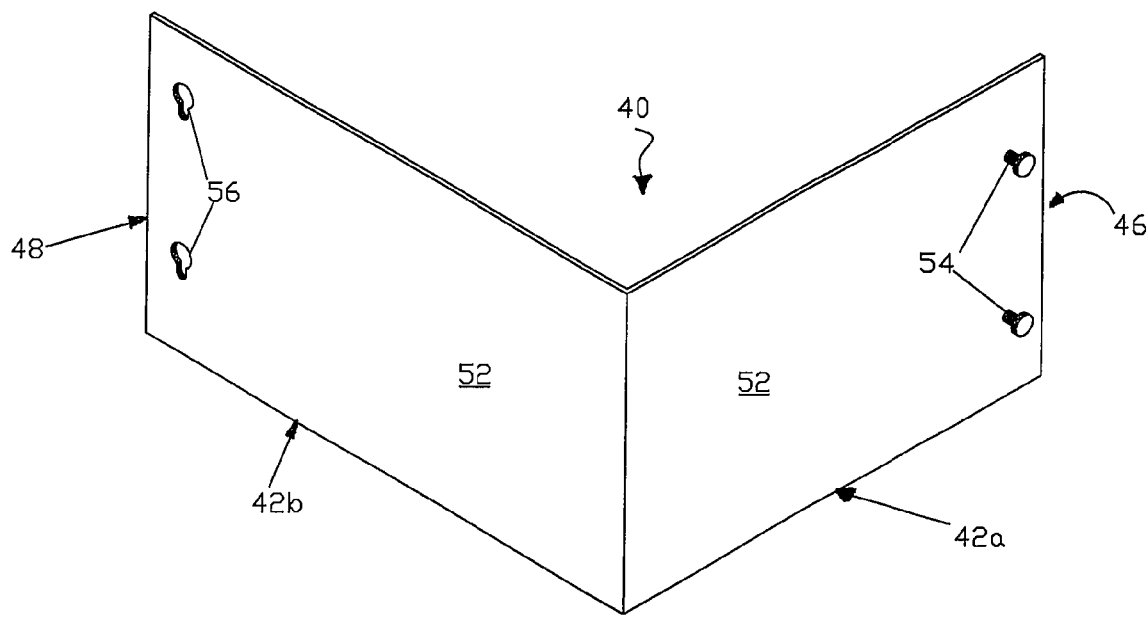
FIGS. 4a-4d illustrate a back perspective, side perspective, top, and side views, respectively, of a corner containment rail comprising pin connecting members and keyhole openings for use in a battery spill containment system in accordance with an embodiment of the present invention.
Figure 4B:
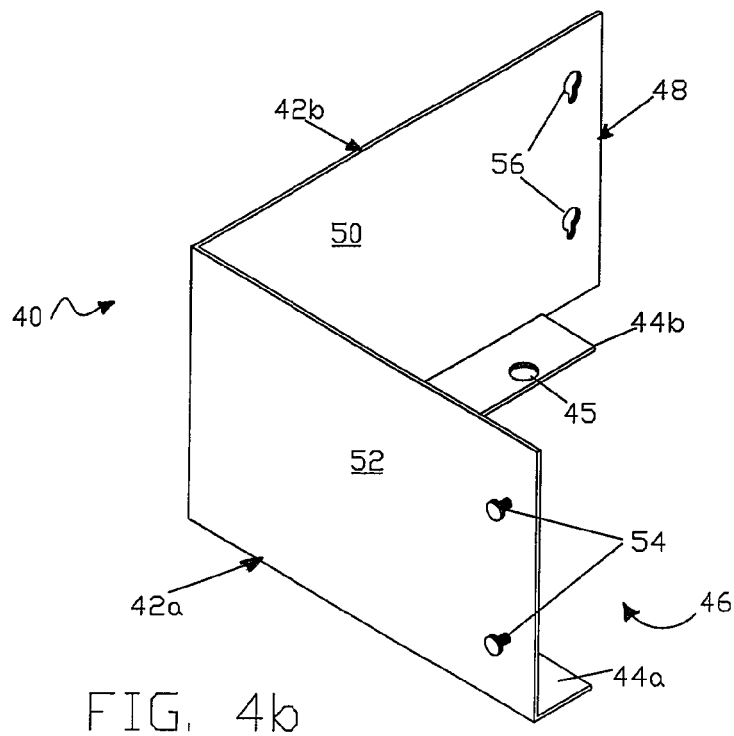
Figure 4C:
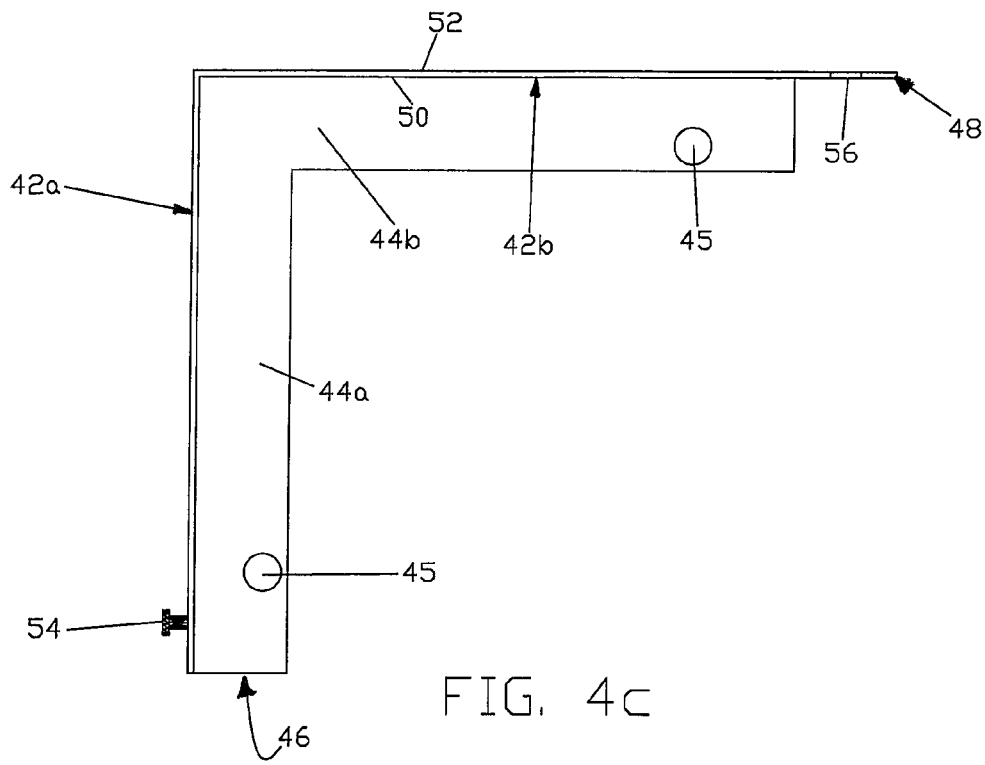
Figure 4D:
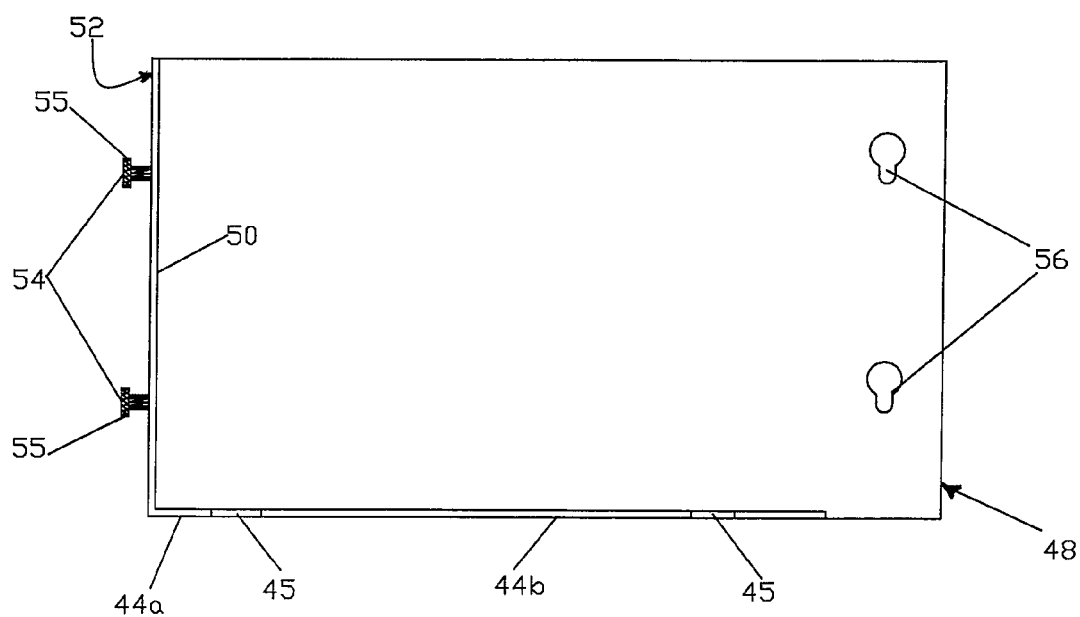
Figure 4E:
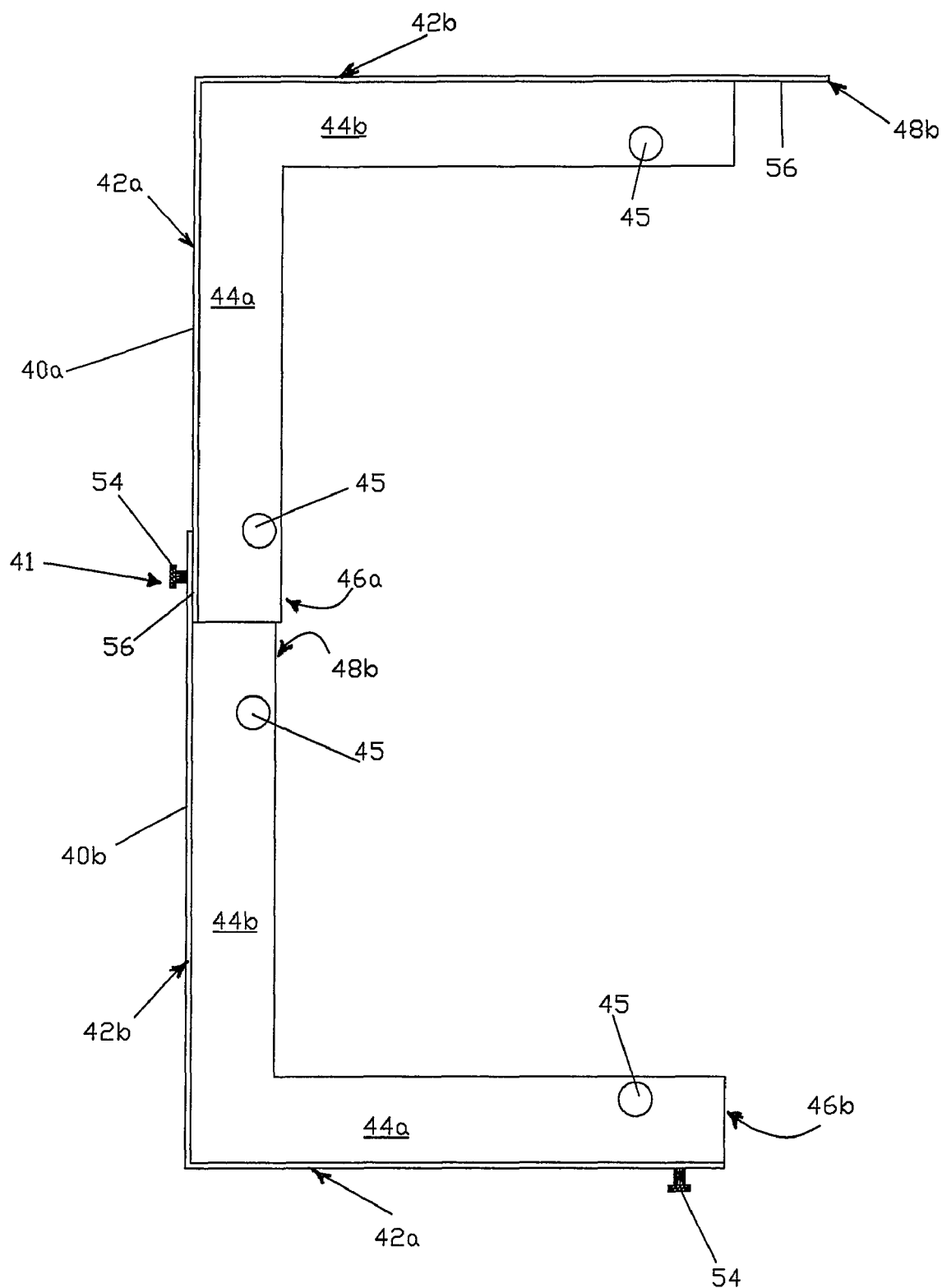
FIG. 4e illustrates a top view of two connected corner containment rails of FIGS. 4a-4d in an overlapping relationship in accordance with an embodiment of the present invention.

FIG. 4e illustrates a top view of two connected corner containment rails 40a, 40b of FIGS. 4a-4d in an overlapping relationship as shown by overlap region 41. A first connection end 46a of a first rail 40a with a male connecting device or pin 54 is connected to a second connection end 48b of a second rail 40b with a female or keyhole opening 56. As shown, when the first rail 40a is connected to the second rail 40b, at least a part of the first end 46a of the first rail 40a is in an overlapping relationship with the second end 48b of the second rail 40b. Thus, the overlap region 41 strengthens the connection between the rails 40a, 40b. In an embodiment, the overlap region 41 also allows for the end of the flanges 44a, 44b of each rail 40*a*, 40*b* to substantially align and meet so as to provide a substantially uniform design and provide a structure which better assists in battery spills.

FIGS. 5*a*-5*f* illustrate front, top, perspective, and side views of a containment rail 60 comprising male connecting members 74 in the form of locking arms and female connecting members 76 in the form of corresponding receiving portions for use in a battery spill containment system in accordance with an embodiment of the present invention. As shown in greater detail in FIG. 5*e*, the locking arms 74 may be in the shape of a sectioned chevron or be crenulated or toothed to some extent. This configuration is preferred because it provides a snapping or sealing design that signals securement and works to prevent inadvertent or unwanted separation. Containment rail 60 may be used as an intermediate section or side rail in system 10 as shown in FIG. 1, for example. The rails 60 may be connected to other rails (e.g., with other side rails 60 or with corner rails) to form a perimeter or area around at least one battery 120, or they may be mounted indirectly so as to prevent substantial movement of one rail relative to another rail.

Figure 5A:
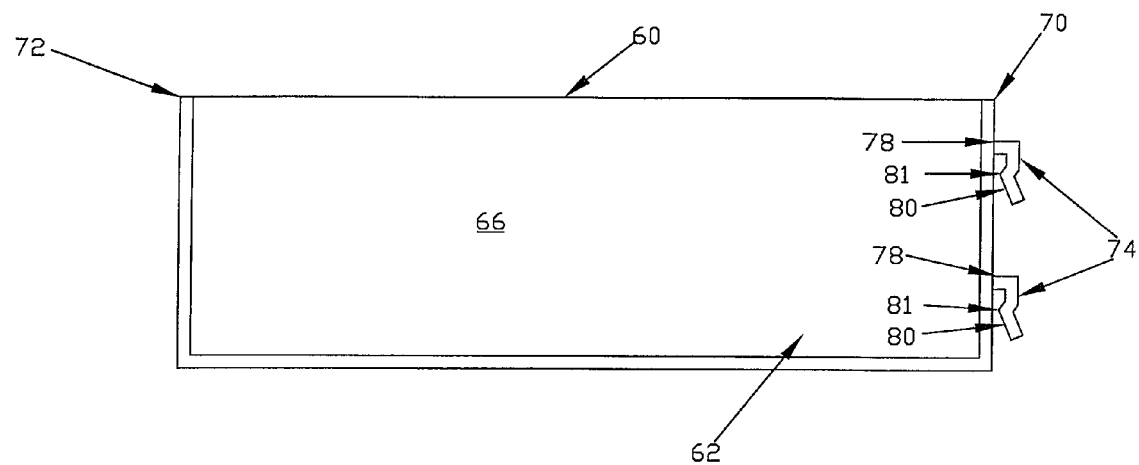
FIGS. 5a-5e illustrate front, top, perspective, and side views of a containment rail comprising locking arms and corresponding receiving portions for use in a battery spill containment system in accordance with an embodiment of the present invention.
Figure 5B:
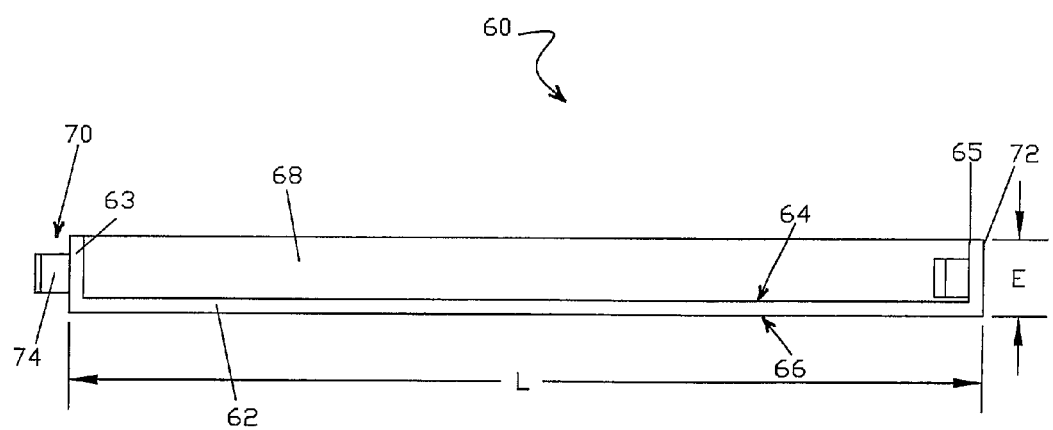
Figure 5C:
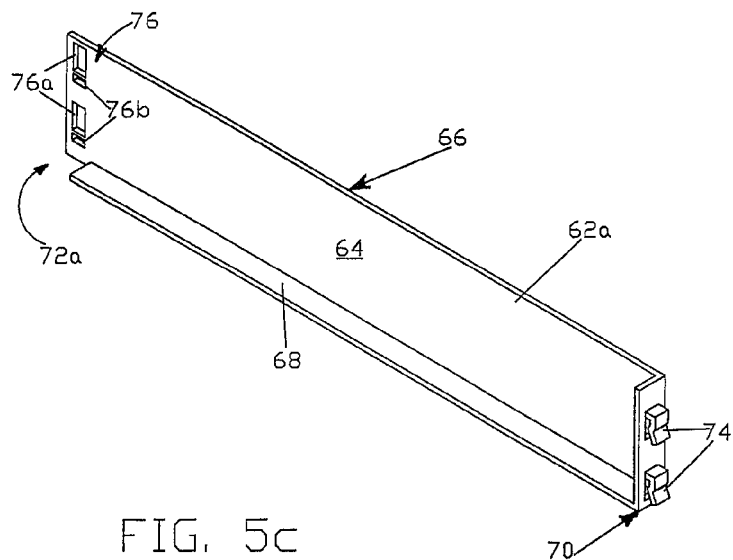
Figure 5D:
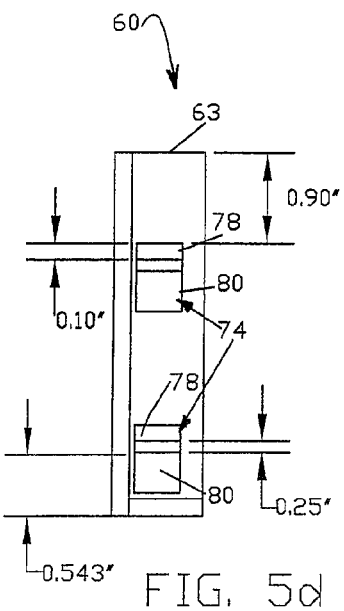
Figure 5E:
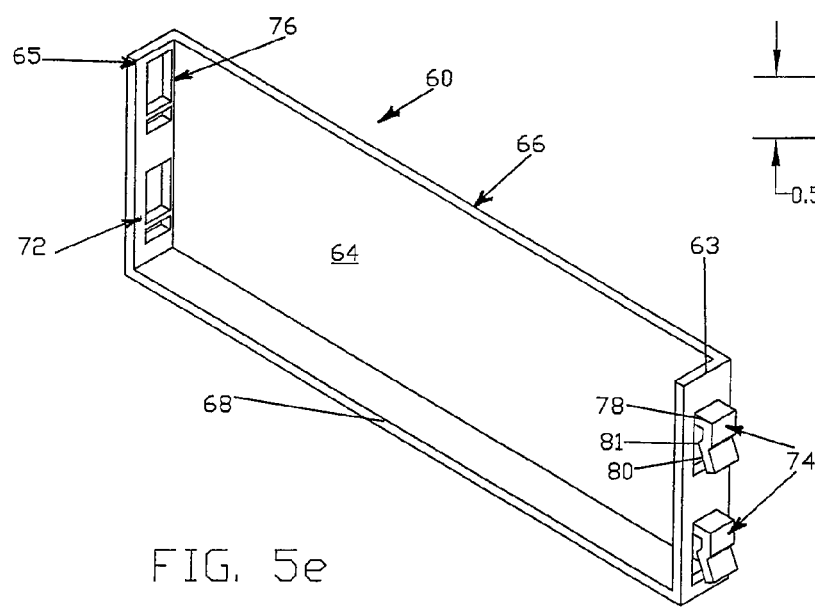
Figure 5F:
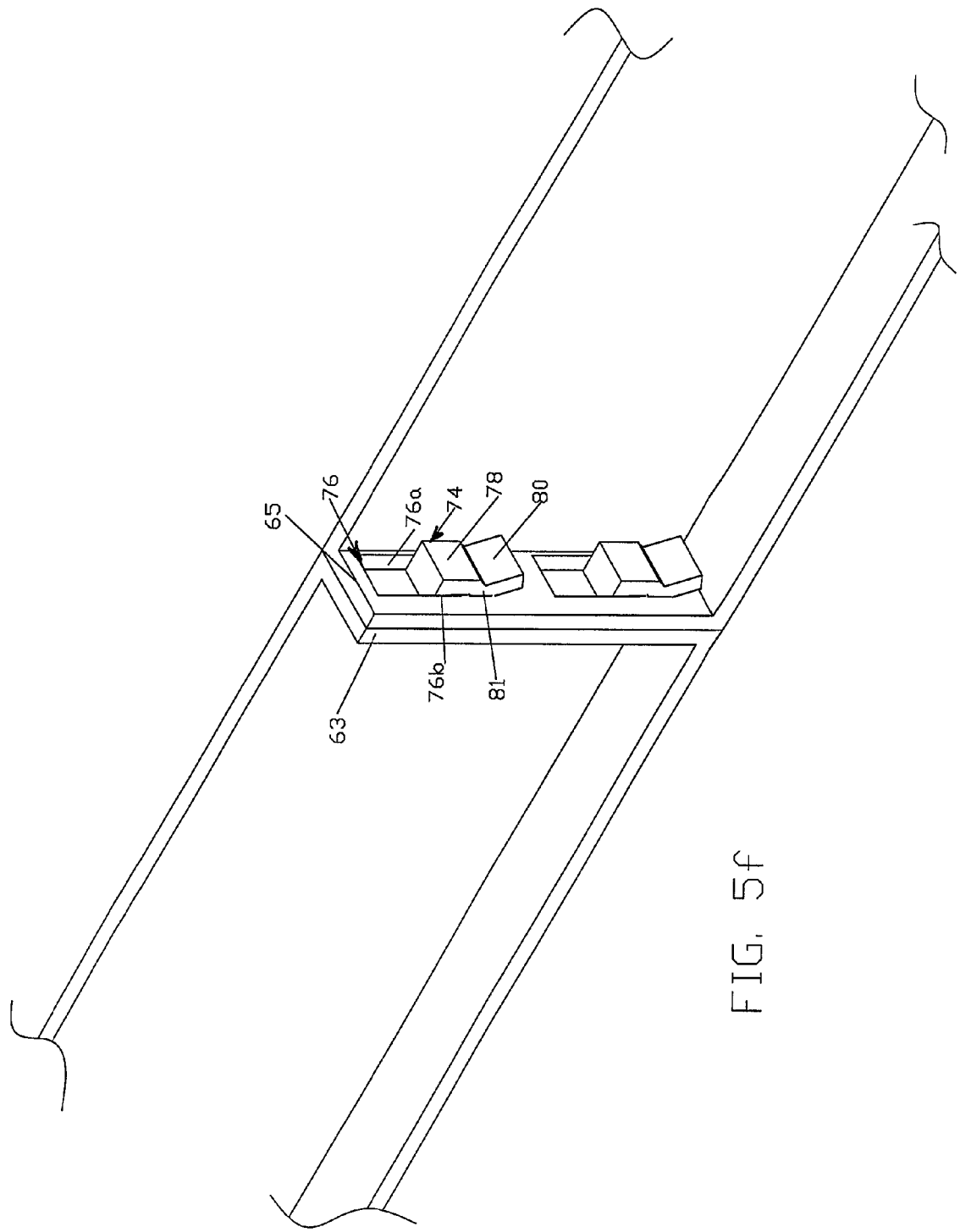
FIG. 5f illustrates a detailed, perspective view of the connection of containment rails as shown in FIG. 5e.

The containment rail 60 comprises a side wall 62 and a floor mounting flange 68. The side wall 62 comprises an inside wall 64 and an outside wall 66. Inside wall 64 is provided such that when a perimeter is formed around at least one battery, the inside wall 64 faces the battery while outside wall 66 faces the opposing direction. The floor mounting flange 68 is provided to mount or attach a rail 60 to floor. As best shown in FIGS. 5*b*, 5*e*, and 5*f*, the floor mounting flange 68 may comprise no holes or openings. Thus, in an embodiment, the floor mounting flange 68 may be connected to a floor using adhesive or glue.

In an embodiment, the floor mounting flange 68 may comprise at least one hole to attach the rail 60 to a floor of a basement or warehouse (e.g., where the at least one battery or rack of batteries are herein provided), for example. In an embodiment, the hole(s) allows a screw, nail, threaded fasteners, bolts, or any other mounting to connect or mount the rails 60 to the floor or other structure. In an embodiment, neither glue nor fasteners are provided. Generally, any known method of mounting a rail to a floor or surface may used with the rails 60 described herein.

The side wall 62 of rail 60 also comprises a first end 70 and an opposite or second end 72. First end 70 and second end 72 comprise extension walls 63 and 65, respectively, that protrude or extend from the ends of the side wall 62. More specifically, as shown in FIG. 5*e*, extension walls 63, 65 may generally extend perpendicularly to the side wall 62. In an embodiment, an end of each of the extension walls 63, 65 may be connected to each end of the floor mounting flange 68 (e.g., see FIG. 5*f*). Extension walls 63, 65 provide additional strength and reinforcement when connecting a plurality of rails 60, for example.

As shown, the extension walls 63, 65 of the rail 60 may comprise male connecting devices or members 74 and female connecting devices or members 76, respectively. However, it should be noted that the location of the male and female connecting devices 74, 76 may be interchangeable. In an embodiment, only one end 70 or 72 may comprise an extension wall. For example, as shown in FIG. 5*c*, the side wall 62*a* is provided with a substantially straight second end 72*a* (i.e., second end 72*a* does not comprise an extension wall). Female connecting devices 76 (further described below) may be provided on the second end 72*a* of the side wall 62*a*. Alternatively, male connecting devices 74 may be provided to extend from the outside 66 of the side wall 62 (not shown).

The male connecting devices 74 may comprise locking arms with a first extending portion 78 and a locking portion 80. The first extending portion 78 extends outwardly and downwardly from extension wall 63. The locking portion 80 is connected to the first extending portion 78 and extends downwardly from first extending portion 78. Both the first extending portion 78 and locking portion 80 are generally parallel to the outside of extension wall 63, forming a right angle with respect to the wall 63. In an embodiment, the locking portion 80 may extend at angle with respect to the first extending portion 78, creating a locking edge 81. The locking edge 81 may be received by a part of the receiving portion 76 to assist in locking rails together. An example of using the locking edge 81 is further described below.

The female connecting devices 76 may comprise receiving portions or openings that are designed to receive the first extending portion 78 and locking portion 80 of locking arms 74 therein for connecting a first end 70 of a rail to a second end 72 of a separate, second rail. The receiving portions 76 may comprise a complimentary or corresponding shape or shapes to that of the locking arms 74. In an embodiment, the receiving portions 76 may comprise multiple openings. For example, as shown in FIG. 5*c*, the receiving portions 76 may comprise first and second openings 76*a* and 76*b*. The first opening 76*a* may be an elongate opening for which the locking arm 74 (e.g., first extending portion 78 and locking portion 80) is placed through. The second opening 76*b* may be an opening designed to receive at least a part of locking portion 80 of the locking arm 74. For example, the second opening 76*b* may receive the locking edge 81 of the locking portion 80.

The method of connecting the locking arms 74 and receiving portions 76 of a plurality of rails 60 may be performed as follows. When connecting rails with a straight second 72*a* and one extension end 70, such as shown in FIG. 5*c*, the connecting devices 74, 76*a*, and 76*b* connect in a similar manner as described above. That is, when male connecting devices 74, provided on a straight end of second rail, the locking arms 74 of the second rail are aligned with the openings 76*a* of the second end 72*a* of the rail 64 of FIG. 5*c*. The locking arms 74 of the second rail are then pushed through the receiving portions 76*a* of the rail. After insertion, the rail is connected and locked with the second rail by applying a pressure to the first rail such that the locking arms 74 of the second rail move downwardly with respect to the receiving portions 76*a*, 76*b*. More specifically, an edge 81 of the locking portion 80 moves into the second opening 76*b* of the receiving portion 76 to lock the first and second rails to each other, and an overlapping, locking relationship is formed.

To connect rails 60 as shown in FIG. 5*e*, an extension wall 63 on a first end 70 of a first rail is aligned with an extension wall 65 on a second end 72 of a second rail such that the first extending portion 78 and locking portion 80 of locking arms 74 extending from the extension wall 63 are aligned with the receiving portions or openings 76 in extension wall 65. The locking arms 74 are then pushed through the receiving portions 76 of the second rail, and pressure is applied as noted above such that the edge 81 of the locking portion 80 moves into the opening 76*b* and the rails are locked together. FIG. 5*f* illustrates a detailed perspective view of the locked or finished connection of the containment rail of FIG. 5*e* using this method.

The rail 60 may comprise a plurality of lengths. The side wall 62 may also comprise a plurality of lengths. For example, in an embodiment, the side wall 62 may comprise a length substantially equal to the overall length of the rail. In an embodiment, the side wall 62 may comprise a length that is determined by the presence of at least one extension wall (e.g., see FIGS. 5c and 5e). In an embodiment, the side wall 62 may comprise a length L of approximately 11.625 inches (29.53 centimeters). In an embodiment, the side wall 62 and/or rail 60 may comprise a height of approximately 4 inches (10.16 centimeters). The floor mounting flange 18 may comprise any number of lengths. For example, the floor mounting flange 18 may comprise the same length as the side wall 62 and/or rail 60. The flange 18 may also comprise a shorter length than that of the side wall 62 and/or rail 60, which may also be determined by the presence of an extension wall(s). As noted above, an extension wall may be provided on none, one, or both ends 70, 72 of the rail 60. The extension walls 63, 65 may comprise a thickness of 0.1875 inches (0.47625 centimeters) and a width of 1 inch (2.54 centimeters), for example. The rail 60 and its parts may comprise any number of lengths, widths, heights, and/or thickness measurements.

As noted above, the advantages of using the connecting devices as shown in FIGS. 4a-5f include that the rails may be installed quickly and easily in a designated space at low cost. The system also requires less tools and parts, as the rails themselves provide a locking system (rather than using hardware such as bolts, nuts, and the like). The system provides the ability to disassemble or detach the rails from each other and reassemble with ease, thus assisting in decreasing the amount of required labor and assembly time. Additionally, a greater number of batteries may be stored in a given space, provide easy access to the batteries, and improve modularity of designs.

The rails are also reusable. Additionally, when the rails are connected to each other, the rails are designed to support each other and become a free-standing object. Thus, the structural integrity of the system is increased.

Furthermore, upon connecting a first rail to a second rail, at least a part of the first connection end of the first rail is provided in an overlapping relationship with the second connection end of the second rail. The overlapping connection of the rails (e.g., which form a perimeter around a battery(ies)) provides a reinforced connection between the rails of the battery spill containment system. Additionally, in some instances, the overlap region allows for the ends of the flanges of each connected rail to substantially align and meet, so as to provide a substantially uniform design and provide a structure which better assists in battery spills.

Figure 6A:
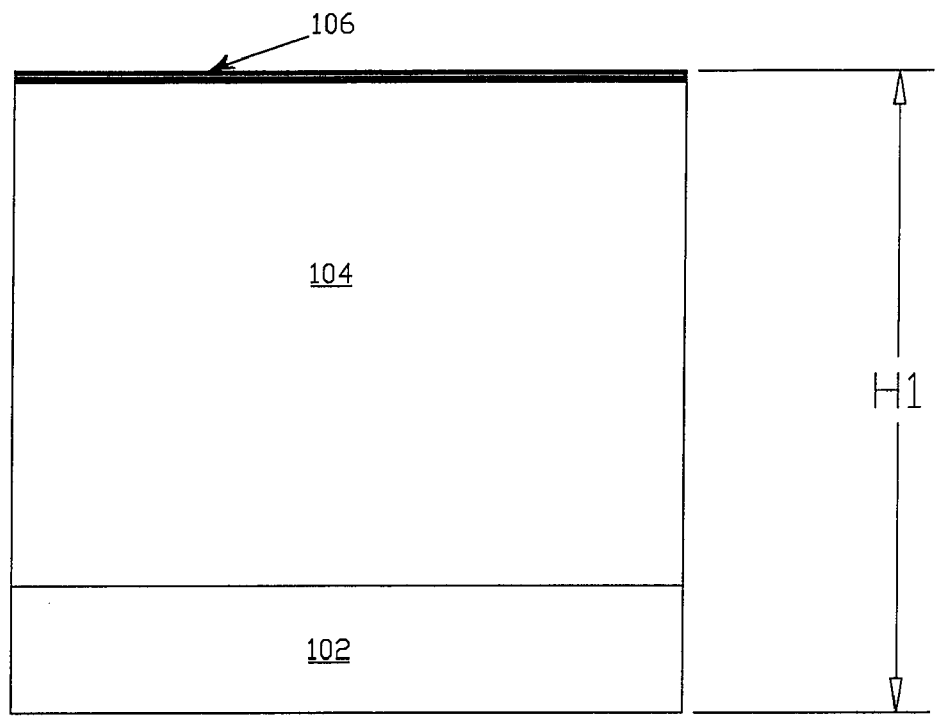
FIGS. 6a-6c illustrate a front, side, and perspective view, respectively, of a clip device for use with a battery spill containment system in accordance with an embodiment of the present invention.
Figure 6B:
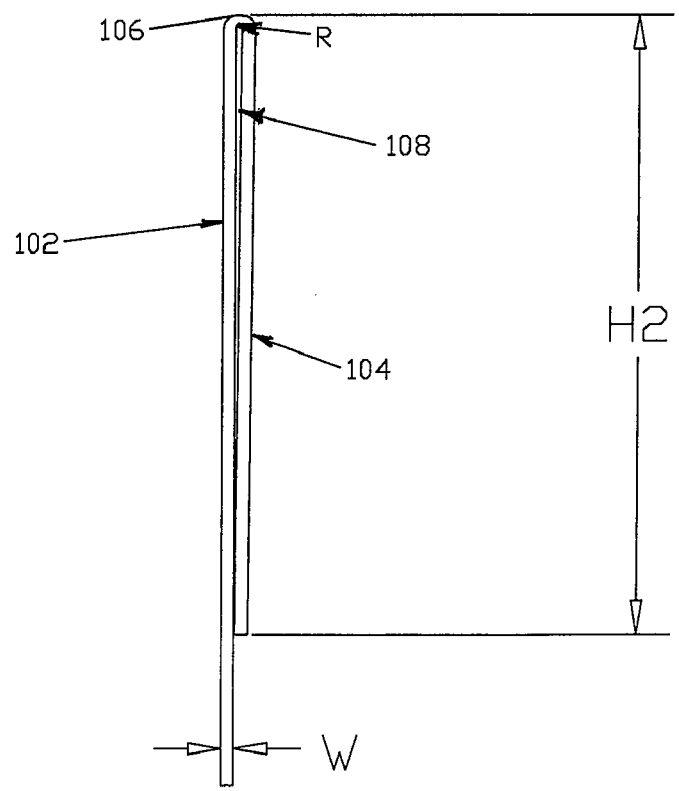
Figure 6C:
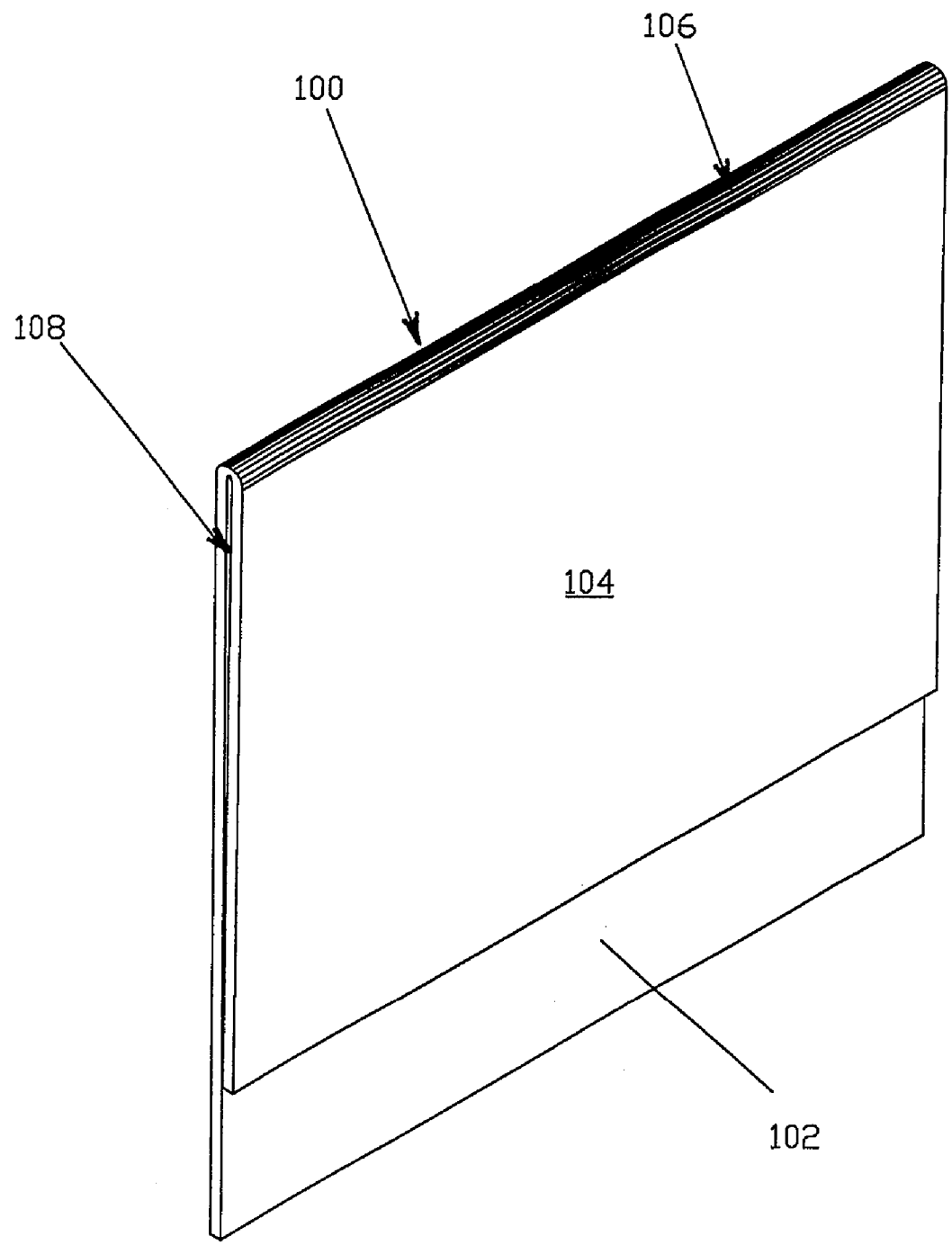

FIGS. 6a-6c illustrate a front, side, and perspective view, respectively, of a clip device 100 for use with a battery spill containment system in accordance with an embodiment of the present invention. For example, clip device 100 may be used with the rails and system as described above in FIGS. 1-5e. The clip device 100, or clip 100, comprises a first wall 102 connected to a second wall 104 by a radial edge 106. The clip 100 may be used to hold the top edge of a liner to the top edge of a rail. For illustrative purposes only, the clip 100 will be described with reference to containment rail 12. The arrangement may be sufficiently secure such that it allows the containment rail 12 to define a stable perimeter for housing a battery. The clips 100 provided on system 10 and liner 124 may act as a coupler. In an embodiment, clips 100 may not be required when the top edge of the containment rail 12 has a hook or other securement mechanism to which the liner 124 may attach. The length of the clips 100 may be changed as needed. For example, a long clip or several short clips may be used. The shape and configuration of each clip 100 may also be changed as desired. Although FIGS. 6a-6c show a "U"-shaped clip, the clip 100 may comprise any number of shapes.

The clip 100 is designed to be attached to the rail 12 and receive the wall 14 of the rail 12 in the space 108 between the first and second walls 102, 104. Generally, the first wall 102 lies adjacent the outside wall 28 of the side wall 14, while the second wall 104 lies adjacent the inside wall 26. The inside of radial edge 106 may be in contact with the top of the rail 12. In an embodiment, the first wall 102 comprises an overall height H1 that is substantially equal to the length of the wall of the containment rail it is attached thereto. For example, the height H1 of the first wall may be 3.75 inches (9.525 centimeters). In an embodiment, the second wall 104 comprises an overall height H2 that may be insert into the perimeter formed by the rails 12. For example, the height H2 may be approximately 3.1 inches (7.874 centimeters). The radial edge may comprise a radius R of 0.0625. In an embodiment, the clip 100 may have a thickness or width W2 of 0.0625 inches (0.2 centimeters). However, the measurements of clip 100 should not be limited to those listed herein, and the clip 100 may comprises any number of measurements.

Figure 7A:
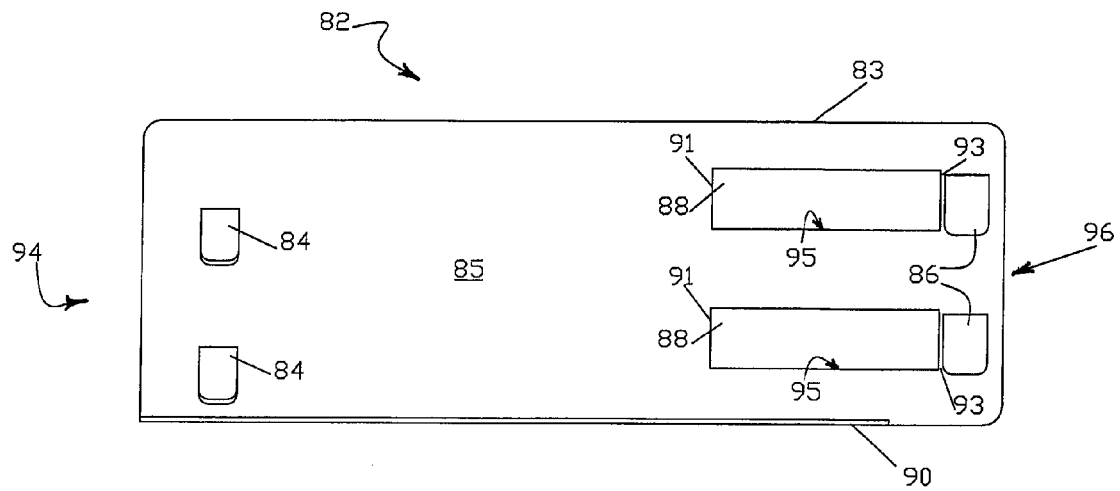
FIGS. 7a-7c illustrate a front, back, and perspective view, respectively, of an adjustable containment rail comprising male connecting devices and female connecting devices for use in a battery spill containment system in accordance with an embodiment of the present invention.
Figure 7B:
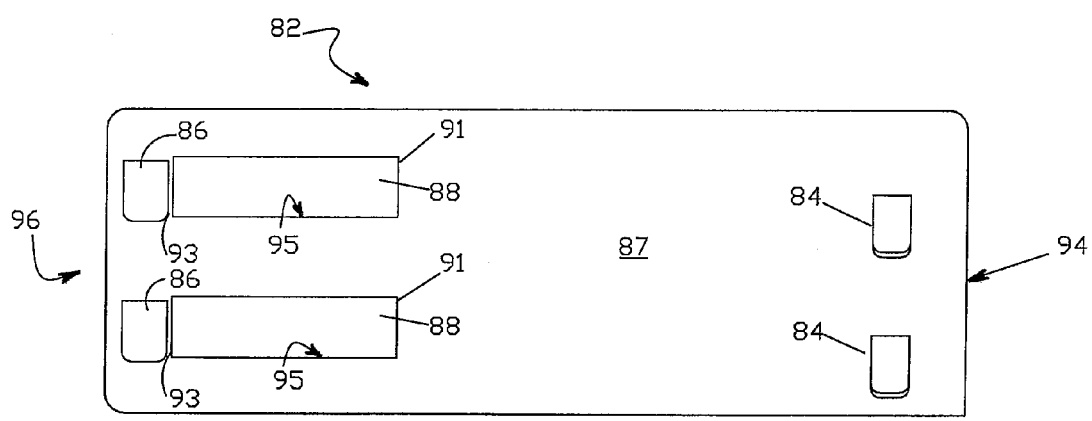
Figure 7C:
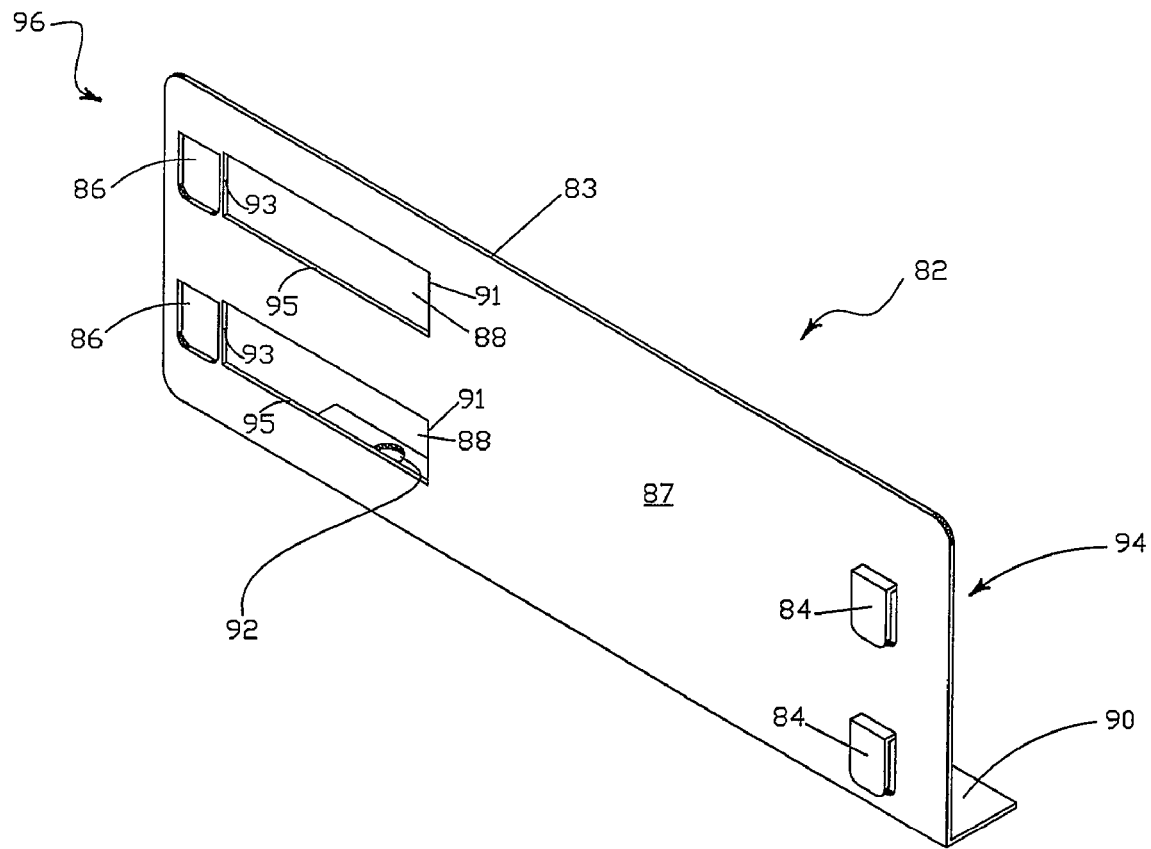

In an embodiment, the rails may include an adjustable device so that when rails are connected to each other, the overlap region (such as overlap region 41 illustrated in FIG. 4e) may be adjusted. For example, FIGS. 7a-7c illustrate a front, back, and perspective view, respectively, of an adjustable containment rail 82 comprising male connecting devices 84 and female connecting devices 86 for use in a battery spill containment system in accordance with an embodiment of the present invention. Adjustable containment rail 82 also comprises a side wall 83 and a floor mounting flange 90. Much like the rails described above, the side wall 83 comprises an inside wall 85 and an outside wall 87. Inside wall 85 is provided such that when a perimeter is formed around at least one battery, the inside wall 85 faces the battery while outside wall 87 faces the opposing direction. The floor mounting flange 90 is provided to mount or attach a rail 82 to floor. In an embodiment, as noted above, the floor mounting flange 90 comprises at least one hole 92 to attach the rail 82 to a floor of a basement or warehouse, for example. Generally, adjustable containment rail 82 may comprise similar features such as those disclosed in the previous Figures. Male connecting devices 84 and female connecting devices 86, as shown, are provided on a first connection end 94 and an opposite or second connection end 96 of the side wall 83. In an embodiment, the connecting devices 84, 86 may be similar to the male and female connecting devices 30, 32 as shown in FIGS. 2a-3d (e.g., "L"-shaped tabs with first and second walls projecting from the side wall 83 and corresponding openings that are designed to receive the orthogonal projections). However, in an embodiment, any type of male and female connecting devices such as those illustrated by 54 and 56 or 74 and 76, for example, may be used.

Adjustable containment rail 82 also comprises longitudinal slots 88. Longitudinal slots 88 are elongated female connecting devices or openings designed to receive male connecting devices 84 from a second rail therethrough, for example. Longitudinal slots 88 are generally parallel and extend along the side rail 83 longitudinally. Longitudinal slots 88 comprise a first end 91 and a second end 93, and a bearing surface 95 for receiving and locking with the surfaces or projections of the male connecting devices 84. As shown in the Figures, longitudinal slots 88 may be provided adjacent or proximal to the female connecting devices 86 on the second connection end 96. Longitudinal slots 88 allow for adjustment of the area or length of the overlap region when connecting two rails. For example, instead of connecting male connecting devices 84 into female connecting devices 86, male connecting devices 84 may be insert, adjusted, and locked at a plurality of positions along the bearing surface 95 of the longitudinal slots 88. The male connecting devices 84 may also be locked at either end 91 or 93 of the longitudinal slots 88.

To connect rails using the longitudinal slots 88 of an adjustment rail 82, a first end 94 of a first rail 82 is aligned with a second end 96 of a second rail (e.g., another adjustment rail 82) such that the male connecting devices 84 extending orthogonally from the side wall 83 of the first rail 82 are aligned with the longitudinal slots 88 in the side wall of the second rail. After inserting the male connecting devices 84 through the slots 88 of the second rail, the overlap region may be adjusted. That is, the male connecting devices 84 of the first rail 82 are moved along the length of longitudinal slot 88 between the ends 91, 93 until a desired position is located. The first rail 82 is connected and locked with the second rail by applying a downward pressure to the first rail 82 such that the male connecting devices 84 move downwardly with respect to the longitudinal slots 88 and into locking contact with the bearing surface 95.

Although the method of connecting rails above describes connecting two adjustable containment rails 82, an adjustable rail 82 may be connected with any kind of rail with male and female connecting devices. For example, one or more adjustable containment rails 82 may be used in connection with a plurality of rails 12 or 16. Additionally, any number of adjustable containment rails 82 may be used when assembling the spill containment system 10 around the perimeter of at least one battery. In some embodiments, the female connecting devices 86 may be used to connect rails 82 together, without the need to use the longitudinal slots 88.

In some embodiments, longitudinal slots 88 may be altered to correspond to the shape of the male connecting devices of the rails. The longitudinal slots 88 and bearing surfaces 95 may comprise any number of locking regions with shapes or designs to receive and lock male connecting devices in a plurality of regions along its length. For example, the bearing surface 95 may be altered to include a plurality of cut-outs or keyholes to receive a pin 54 of a male connecting device (as shown in FIGS. 4a-4d) at a number of regions or positions therein. Thus, the design of the slots 88, ends 91, 93 and bearing surfaces 95 should not be limited to those illustrated.

In another embodiment, it is envisioned that one or more rails may be connected to an adjustable containment rail 82. For example, an adjustable containment rail 82 may have a first rail connected in and/or along the longitudinal slots 88 and a second rail connected to the female connecting devices 86 of the adjustable containment rail 82. Further, first and second rails may also both be attached to the longitudinal slots 88 of the adjustable containment rail 82. The use of a plurality of rails may provide added strength in the overlapping region as well as added protection in the case of a battery spill or leak, for example.

While the principles of the invention have been made clear in the illustrative embodiments set forth above, various modifications may be made to the structure, arrangement, proportion, elements, materials, and components used in the practice of the invention. For example, although two male and female connecting devices are shown for connecting the rails in the system, any number of male and female connecting devices may be provided to connect the rails with an overlapping connection. As another example, the battery spill containment system 10 may also be assembled with a rigid liner (rather than flexible liner 124 as shown in FIGS. 1a and 1b). Additionally, the lengths and dimensions provided throughout the description and drawings should not be limiting.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the preceeding text and the following claims.

What is claimed is:

1. A battery spill containment rail system for containing a hazardous spilled substance from at least one industrial battery, the system comprising:
   a plurality of containment rails connectable to one another to define a perimeter having to accommodate at least one industrial battery, each rail comprising at least one wall comprising a first connection end and a second connection end;
   a first rail of the plurality of rails having a male connecting device at a connection end;
   a second rail of the plurality of rails having a female connecting device at a connection end;
   the male connecting device of the first rail constructed and arranged to be removably received within the female connecting device of the second rail when connecting the first and second rail, and
   wherein, upon connecting the first rail to the second rail, at least a part of the first connection end of the first rail is in an overlapping relationship with the second connection end of the second rail.

2. A system according to claim 1, further comprising a liner for placement within the perimeter defined by the plurality of containment rails, the liner being resistant to damage from the spilled substance.

3. A system according to claim 1, further comprising a material for placement within the perimeter defined by the plurality of containment rails, the material for absorbing and chemically neutralizing the spilled substance.

4. A system according to claim 3, wherein the absorbing substance is contained in a sock or pillow.

5. A system according to claim 1, wherein the female connecting device comprises a shape corresponding to and opposite to the male connecting device.

6. A system according to claim 1, wherein the male connecting device comprises a locking arm having a pinching surface and the female connecting device comprises an opening on the second connection end having a surface for opposing the pinching surface of the locking arm.

7. A system according to claim 1, further comprising an electrical storage battery, the battery containing a caustic material.

8. A system according to claim 1, wherein the female connecting device further comprises a slot extending longitudinally along the at least one wall and proximally from the second connection end.

9. A modular battery spill containment system for containing a hazardous spilled substance from at least one battery, the modular battery spill containment system comprising:
   a plurality of containment rails defining a perimeter around at the least one battery, each rail comprising at least one wall, the at least one wall comprising a first end and a second end;
   at least one connection device orthogonally protruding from the first end of each rail;
   at least one opening provided in the second end of each rail;
   the first end of each rail constructed and arranged to be removably received within a second end of another rail of the plurality of containment rails, and wherein the first and second ends of the rails are provided in an overlapping relationship upon connecting the plurality of rails to form the perimeter.

10. A system according to claim 9, further comprising a liner for placement within the perimeter defined by the plurality of containment rails, the liner being resistant to damage from the spilled substance.

11. A system according to claim 10, wherein the liner has been welded to form a shape corresponding with a perimeter defined by the containment rails.

12. A system according to claim 9, further comprising a material adapted to be placed in the perimeter of the plurality of rails, the material adapted to absorb and chemically neutralize the spilled substance.

13. A system according to claim 9, wherein one or more rails are bent to define an angle.

14. A system according to claim 13, wherein the angle defined is one of: 45 degrees, 60 degrees, or 90 degrees.

15. A system according to claim 9, wherein the second end of the rails comprise an elongated slot to receive the at least one connection device of another rail, and wherein the connection device is locked along a plurality of regions of the elongated slot.

16. A method for assembling a modular battery spill containment system for containing a hazardous spilled substance from at least one industrial battery, the method comprising:
  aligning ends of a first and second rail, the rails comprising at least one wall, a first end, and a second end;
  inserting an orthogonal protrusion of the first end of the first rail through an opening in the second end of the second rail to connect the first rail to the second rail;
  connecting a plurality of rails to form a perimeter around at least one battery;
  placing a liner within the perimeter defined by the plurality of containment rails, the flexible liner being resistant to damage from the spilled substance;
  placing a material in the perimeter of the rails, the material adapted to absorb and chemically neutralize the spilled substance;
  wherein upon connecting the plurality of containment rails at least a part of the first connection end of each of the rails is in an overlapped relationship with a second end of another rail.

17. An assembled battery spill containment device, the device comprising:
  a plurality of containment rails removably connected to each other;
  the plurality of containment rails defining a perimeter and a volume, and
  one or more batteries positioned within the perimeter defined by the containment rails,
  the containment rails connected to one another by male and female connecting devices, wherein ends of the connected containment rails overlap each other.

18. A device according to claim 17, further comprising a liner for placement within the perimeter defined by the plurality of containment rails, the liner being resistant to damage from the spilled substance.

19. A device according to claim 17, further comprising a material for placement within the perimeter defined by the plurality of containment rails, the material for absorbing and chemically neutralizing the spilled substance.

20. A device according to claim 19, wherein the absorbing substance is contained in a sock or pillow.

21. A device according to claim 17, wherein the female connecting device comprises a shape corresponding to and opposite to the male connecting device.

22. A device according to claim 17, wherein the male connecting device comprises a locking arm having a pinching surface and the female connecting device comprises an opening on the second connection end having a surface for opposing the pinching surface of the locking arm.

23. A device according to claim 17, wherein the female connecting device comprises a longitudinal slot with a bearing surface, and wherein the bearing surface comprises a plurality of locking regions each having a shape corresponding to and opposite to the male connecting device.

24. A device according to claim 17, further comprising an electrical storage battery, the battery containing a caustic material.

* * * * *